United States Patent [19]

Mori

[11] Patent Number: 4,588,151
[45] Date of Patent: May 13, 1986

[54] SOLAR RAY COLLECTOR FOR SPACECRAFT

[76] Inventor: Kei Mori, 3-16-3-501, Kaminoge, Setagaya-ku, Tokyo, Japan

[21] Appl. No.: 630,036

[22] Filed: Jul. 12, 1984

[30] Foreign Application Priority Data

Sep. 16, 1983 [JP] Japan ............................... 58-171781

[51] Int. Cl.⁴ .............................................. B64G 1/10
[52] U.S. Cl. .................................... 244/173; 126/417; 126/440
[58] Field of Search ............... 126/424, 425, 438, 439, 126/440, 450; 244/173; 136/243, 244, 245, 255

[56] References Cited

U.S. PATENT DOCUMENTS 3,620,846 11/1971 Paine .................................... 244/173
4,133,502 1/1979 Anchutin ............................ 244/173
4,148,163 4/1979 Chenin ................................ 244/173
4,347,023 8/1982 Rizos .................................. 244/173

FOREIGN PATENT DOCUMENTS 2103011 2/1983 United Kingdom ................ 244/173

Primary Examiner—James C. Yeung
Attorney, Agent, or Firm—Jordan and Hamburg

[57] ABSTRACT

A solar ray collector for a spacecraft includes six posts which are movable into and out of a housing section in the spacecraft and define respectively the apexes of a hexagon. Panel-like collector subassemblies are cantilevered respectively by cross-arms to be rotatable thereabout over 180 degrees between a folded inoperative position and an unfolded operative position. Each of the cross-arms bridges and slides up and down along its associated nearby posts. In the folded position, the subassemblies lie one upon another within the hexagon.

3 Claims, 5 Drawing Figures

SOLAR RAY COLLECTOR FOR SPACECRAFT

BACKGROUND OF THE INVENTION

The present invention relates to a solar ray collector and, more particularly, to a solar ray collector which is suitable for use with a spacecraft.

There has been proposed in various forms a system in which lenses or the like converge solar radiation into light conducting members so that the solar radiation is transmitted to a desired location to serve as a light source such as for lighting or culture of chlorella.

In parallel with the development in space engineering, the expected duration of stay of astronauts and others in the space is growing longer and longer. One of critical conditions for such a long stay in the space is the supply of oxygen and food in a spacecraft. While such may be implemented by loading a spacecraft with oxygen cylinders and food before launching it, the ever increasing number of crews and time of their stay in the space will soon come to require oxygen cylinders and fresh food more than a spacecraft can carry. It is therefore required to furnish a space craft with some implementation for the self-supply of oxygen and fresh food within the spacecraft. The most effective energy source available in the space is, as a matter of course, solar radiation. The prior art solar collection and delivery system previously described, although effective on the earth, are not suitable for use in the space.

SUMMARY OF THE INVENTION

It is therefore an object of the present invention to provide a solar ray collector which is suitable for use in the space.

It is another object of the present invention to provide a generally improved solar ray collector.

A solar ray collector for use with a spacecraft of the present invention comprises posts extending respectively from apexes of a hexagon which is defined on an outer periphery of the spacecraft, cross-arms each bridging the nearby posts and slidable up and down along the nearby posts, and collector subassemblies each having a light receiving surface which is substantially identical in shape with the hexagon, each of the collector subassemblies being rotatably mounted on a respective one of said cross-arms at one side thereof.

In a preferred embodiment, the collector subassemblies, when in operation, are unfolded to the outside of said hexagon such that the light receiving surfaces thereof are substantially perpendicular to the posts and, when out of use, folded to the inside of the hexagon to be stored in a stack.

Preferably, the posts are movable into and out of the spacecraft.

Desirably, another collector subassembly is constantly positioned in the hexagon.

The above and other objects, features and advantages of the present invention will become apparent from the following detailed description taken with the accompanying drawings.

DESCRIPTION OF THE PREFERRED EMBODIMENT

While the solar ray collector for a spacecraft of the present invention is susceptible of numerous physical embodiments, depending upon the environment and requirements of use, a substantial number of the herein shown and described embodiment have been made, tested and used, and all have performed in an eminently satisfactory manner.

Figure 1:
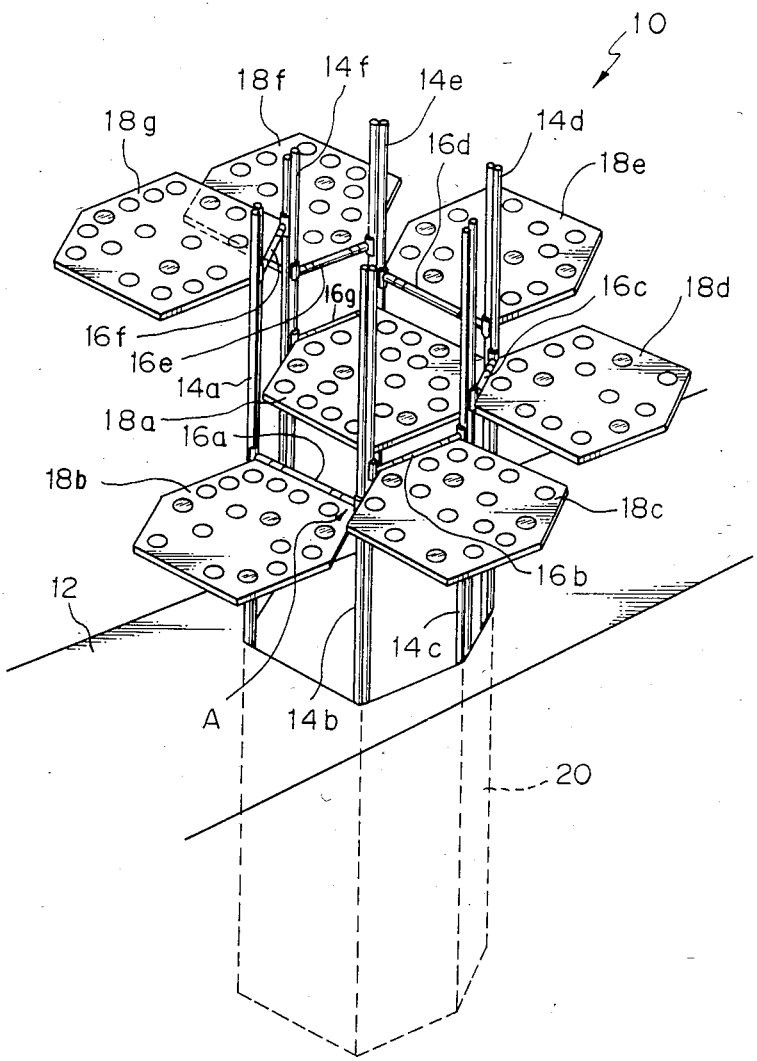
FIG. 1 is a perspective view of a solar ray collector embodying the present invention which is in an unfolded operative position.

Referring to FIG. 1 of the drawings, a solar ray collector embodying the present invention is shown in its unfolded operative position. The collector, generally 10, is mounted on an outer wall 12 of a spacecraft and includes six posts 14a, 14b, 14c, 14d, 14e and 14f which protrude from the outer wall 12. As shown, the posts 14a–14f are located at the apexes of a hexagon. Cross-arms 16a, 16b, 16c, 16d, 16e, 16f and 16g are individually movable up and down along and between the nearby posts 14a–14f. Collector subassemblies 18a, 18b, 18c, 18d, 18e, 18f and 18g are mounted respectively on the cross-arms 16a–16g to be rotatable thereabout between the illustrated unfolded operative position and folded inoperative position, which will be described. The reference numeral 20 designates a housing section defined inside the spacecraft in order to accommodate the solar collector 10. If desired, the housing section 20 may be positioned outside the spacecraft.

Figure 2:
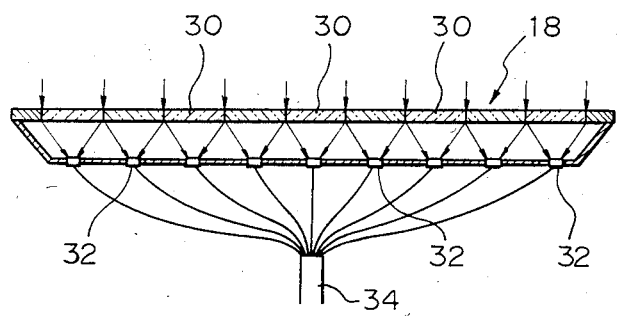
FIG. 2 is a sectional side elevation (along line II—II of FIG. 3) of a collector subassembly desirably applicable to the present invention.
Figure 3:
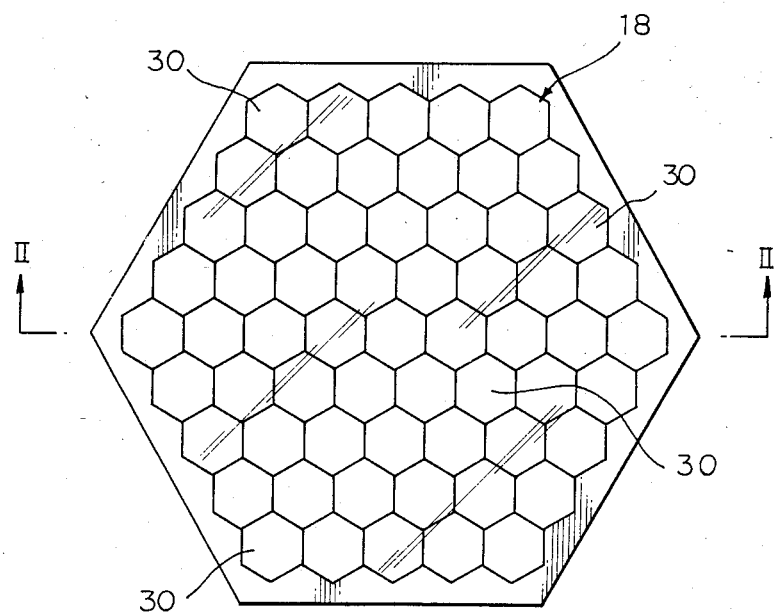
FIG. 3 is a plan view of the collector subassembly shown in FIG. 2.

Details of each collector subassembly 18 are shown in FIGS. 2 and 3. Each collector subassembly 18 has a light receiving surface which is substantially identical in shape with the hexagon defined by the posts 14a–14f. In this particular embodiment, the collector subassembly 18 comprises sixty-one lenses 30 each having a diameter of about 4 centimeters. It should be noted, however, the number of lenses 30 shown and described is only illustrative and even several thousands or more lenses may be used. Optical fibers 32 are arranged such that the light receiving end of each is accurately aligned with the focal point of a respective one of the lenses 30. In this construction, solar rays converged by the lenses into the associated optical fibers 32 are transmitted to desired locations by the optical fibers 32 or, as shown in FIG. 2, by way of a fiber optic cable 34 to which the optical fibers 32 are optically connected.

The collector subassembly 18 shown in FIGS. 2 and 3 has a very thin configuration due to the use of the lenses 30 whose diameter and, therefore, focal length is as short as about 4 millimeters. This renders the whole solar collector construction significantly thin, requiring a minimum of space in a spacecraft. While the lenses 30 shown in FIGS. 2 and 3 have a small hexagonal shape, they may be formed in a circle or any other suitable shape so long as the efficiency concerning occupied area is not critical.

Figure 4:
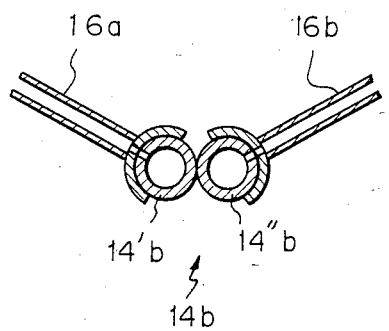
FIG. 4 is a section showing an encircled portion A of FIG. 1 in detail.

Referring to FIG. 4, an encircled portion A of the solar collector shown in FIG. 1 is shown in an enlarged sectional plan view, representing the configuration of the posts 14a–14f and their associated cross-arms 16a–16g. As shown, the post 14b in the portion A is made up of two hollow tubular members, or pipes, 14'b and 14"b which are joined together in a generally cocoon shape. The cross-arms 16a and 16b, which are also holow, respectively grip the pipes 14'b and 14"b and are slide up and down therealong. This configuration applies to all the other associated posts and cross-arms. The construction shown in FIG. 4 allows all the fiber optic cables 34 associated with the collector subassemblies 18a–18g to be led through the bores inside the cross-arms 16a–16g and posts 14a–14f. Solar radiation collected by the collector subassemblies 18a–18g are transmitted by the cables 34 in the cross-arms and posts to the interior of the spacecraft. While the posts 14a–14f have been shown and described as each being made up of two pipes, they may comprise a single hollow member having a general cocoon-shaped cross section.

Each of the hollow posts 14a–14f has thereinside a drive mechanism for moving its associated cross-arms 16 up and down, while each of the cross-arms 16a–16g has thereinside a drive mechanism for rotating its associated collector subassembly 18. When in use, the collector subassemblies 18a–18g are moved out of the housing section 20 and, when out of use such as at the time of launching, they are kept in the housing section 20.

Figure 5:
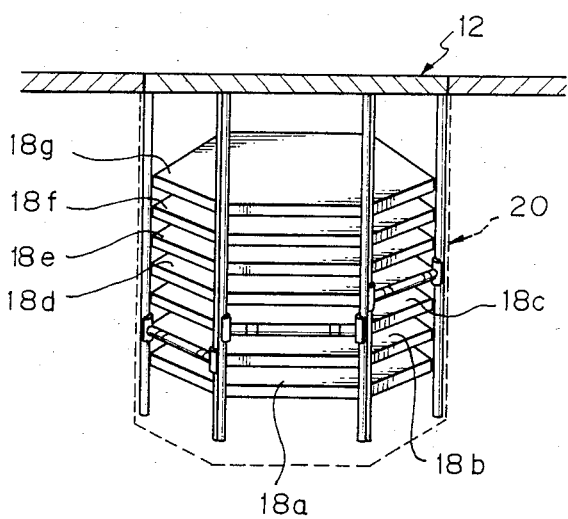
FIG. 5 is a side elevation of the solar ray collector of FIG. 1 which is in a folded inoperative position.

The folded inoperative position of the collector subassemblies 18a–18g is shown in FIG. 5. An exemplary and not restrictive example of the procedure for folding the collector subasemblies 18a–18g from the FIG. 1 position to the FIG. 5 position will be described. First, the cross-arm 16g carrying the subassembly 18a therewith is lowered along the posts 14e and 14f to a lowermost position in the assembly. Then, the cross-arm 16a, for example, is elevated along the posts 14a and 14b to an uppermost position in the assembly. Subsequently, the subassembly 18b is rotated 180 degrees about the cross-arm 16a and over the tops of the posts 14a and 14b until the subassembly 18b settles itself in the hexagonal region defined by the posts 14a–14f. In this position, the cross-arm 16a is lowered along the posts 14a and 14b to lay the subassembly 18b over the subassembly 18a. By the same procedure, the other subassemblies 18c–18g are sequentially elevated to the upper ends of their associated posts, rotated 180 degrees, and then lowered along the posts to be stacked in the hexagonal space. Thereafter, the posts 14a–14f are lowered together so that the whole assembly 10 is bodily retracted into the housing section 20. The top opening of the housing section 20 may be closed by a lid (not shown).

At the time of launching the spacecraft or collecting it, all the collector subassemblies 18a–18g are efficiently stored in a stack inside the housing section 20 as previously stated. After the spacecraft has reached the space, the solar collector 10 is unfolded to its operative position shown in FIG. 1 by the steps of opening the lid (not shown) of the housing section 20, projecting the stack of subassemblies 18a–18g together with the posts 14a–14f to the outside of the spacecraft, and causing the previously mentioned folding procedure to occur in the reverse sequence, that is, sequentially elevating the subassemblies 18g–18b and rotating them 180 degrees in the opposite direction.

In the unfolded position of the solar collector 10, the subassemblies 18b–18g may lie in the same plane with the subassembly 18a positioned in the lowermost portions of the associated posts 14e and 14f. However, any positional relationship between the subassemblies 18a–18g with respect to height is permissible so long as their light receiving surfaces are directed on the sun. Also, the subassemblies 18a–18g may be folded down in any desired sequence if the subassembly 18a is positioned at the bottom of the stack. In this sense, the movement of the subassembly 18a along the posts 14e and 14f is not an essential feature and, instead, the subassembly 18a may be securely mounted in lower portions of the posts 14e and 14f.

Although not shown in the drawings, stops are rigidly mounted on the tops of the posts 14a–14f in order to prevent the cross-arms 16a–16f from slipping off the posts 14a–14f when they are raised to the top of the assembly.

The light receiving surfaces of the subassemblies 18a–18g are oriented sunward relying on a posture control performed by the spacecraft.

In summary, it will be seen that the present invention provides a solar ray collector which is suitable for use with a spacecraft due to the need for a minimum of space. Designed for use in the space, the solar ray collector of the present invention has no gravity during operation and, therefore, requires only a small driving force for raising and lowering and rotating the subassemblies 18a–18g as described. Such a situation also allows the subassemblies 18a–18g to be cantilevered each at one end only.

Various modifications will become possible for those skilled in the art after receiving the teachings of the present disclosure without departing from the scope thereof.

What is claimed is:

1. A solar ray collector adapted to be used for a spacecraft, comprising:
    support means connected to the spacecraft, said supporting means being extended outside the spacecraft in use, said supporting means being formed of at least three posts arranged parallel to each other so that the distance between each adjacent two posts is equal to each other,
    a plurality of holding means connected to and moved along the supporting means, each holding means having an axis and being rotatable relative to the axis, each holding means being in the form of a shaft situated between a respective adjacent two of the posts and extending perpendicular to the posts, and
    a plurality of collector means each connected to a respective holding means so that the collector means are independently movable and rotatable relative to the supporting means, each collector means having a light receiving surface to receive solar rays thereon, the light receiving surface being of a configuration substantially corresponding to an area perpendicular to and surrounded by the posts, said shaft being movable along and rotatable relative to the posts so that when the collector means are not used, the collector means are held in an area surrounded by the posts, and when the collector means are used, the collector means are located substantially outside the area surrounded by the posts.

2. A solar ray collector according to claim 1, in which said supporting means is formed of six posts so that the area perpendicular to and surrounded by the posts is hexagonal.

3. A solar ray collector according to claim 1, in which each collector means comprises a plurality of lenses and optical fibers having light receiving ends, each of said light receiving ends being located on the focal point of a respective one of the lenses.

* * * * *